United States Patent
Lanham et al.

(10) Patent No.: US 8,695,437 B2
(45) Date of Patent: *Apr. 15, 2014

(54) METHOD AND APPARATUS FOR VIBRATIONALY SEPARATING DRIVER AND PICK-OFFS OF A VIBRATING-TYPE FLOW SENSOR ASSEMBLY

(75) Inventors: Gregory Treat Lanham, Longmont, CO (US); Christopher A Werbach, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/376,642

(22) PCT Filed: Jun. 30, 2009

(86) PCT No.: PCT/US2009/049263
§ 371 (c)(1),
(2), (4) Date: Dec. 7, 2011

(87) PCT Pub. No.: WO2011/008191
PCT Pub. Date: Jan. 20, 2011

(65) Prior Publication Data
US 2012/0073385 A1 Mar. 29, 2012

(51) Int. Cl.
*G01F 1/84* (2006.01)
(52) U.S. Cl.
USPC .................................. 73/861.355
(58) Field of Classification Search
USPC ....................... 73/861.355, 861.357
See application file for complete search history.

(56) References Cited

U.S. PATENT DOCUMENTS

| | | |
|---|---|---|
| 5,275,061 A | 1/1994 | Young et al. |
| 6,598,489 B1 | 7/2003 | Van Cleve et al. |
| 6,782,764 B2 | 8/2004 | Osawa |
| 2001/0035055 A1 | 11/2001 | Drahm |
| 2007/0095151 A1 | 5/2007 | Kitami |

FOREIGN PATENT DOCUMENTS

| | | |
|---|---|---|
| DE | 19632500 A1 | 2/1998 |
| EP | 0083144 A1 | 7/1983 |
| GB | 2001759 A | 2/1979 |
| JP | 6299818 U | 6/1987 |
| JP | 11108723 A | 4/1999 |
| WO | 2007103024 A | 11/2007 |

OTHER PUBLICATIONS

U.S. Appl. No. 13/264,795, Gregory Lanham ety al, Oct. 17, 2011.*

* cited by examiner

*Primary Examiner* — Jewel V Thompson
(74) *Attorney, Agent, or Firm* — The Ollila Law Group LLC

(57) ABSTRACT

The present invention provides a vibrating sensor assembly (310). The vibrating sensor assembly (310) includes a conduit (103A), a driver (104), and at least a first pick-off (105). The driver (104) includes a first driver component (104a) and a second driver component (104b). The first pick-off (105) includes a first pick-off component (105a) and a second pick-off component (105b). The vibrating sensor assembly (310) also includes a first reference member (250). The first pick-off component (105a) is coupled to the conduit (103A) while the second pick-off component (105b) is coupled to the first reference member (250). The vibrating sensor assembly (310) also includes a second reference member (350). The first driver component (104a) is coupled to the conduit (103A) while the second driver component (104b) is coupled to the second reference member (350).

10 Claims, 4 Drawing Sheets

METHOD AND APPARATUS FOR VIBRATIONALY SEPARATING DRIVER AND PICK-OFFS OF A VIBRATING-TYPE FLOW SENSOR ASSEMBLY

FIELD OF THE INVENTION

The present invention relates to a vibrating sensor assembly. More particularly, the present invention relates to a vibrating sensor assembly with a driver separated from a pick-off sensor.

BACKGROUND OF THE INVENTION

Vibrating flow devices such as, for example, densitometers and Coriolis flow meters are used for measuring a characteristic of flowing materials, such as, for example, density, mass flow rate, volume flow rate, totalized mass flow, temperature, and other information. Vibrating flow devices include one or more conduits, which may have a variety of shapes, such as, for example, straight, U-shaped, or irregular configurations.

The one or more conduits have a set of natural vibration modes, including, for example, simple bending, torsional, radial, and coupled modes. At least one driver vibrates the one or more conduits at a resonance frequency in one or more of these drive modes for purposes of determining a characteristic of the flowing material. One or more meter electronics transmit a sinusoidal drive signal to the at least one driver, which is typically a magnet/coil combination, with the magnet typically being affixed to the conduit and the coil being affixed to a reference member or to another conduit. The drive signal causes the driver to vibrate the one or more conduits at the drive frequency in the drive mode. For example, the drive signal may be a periodic electrical current transmitted to the coil.

At least one pick-off detects the motion of the conduit(s) and generates a sinusoidal pick-off signal representative of the motion of the vibrating conduit(s). The pick-off is typically a magnet/coil combination, with the magnet typically being affixed to one conduit and the coil being affixed to a reference member or to another conduit. However, it should be appreciated that other pick-off arrangements exist such as for example, optical, capacitance, piezo-electric, etc. The pick-off signal is transmitted to the one or more electronics; and according to well known principals the pick-off signal may be used by the one or more meter electronics to determine a characteristic of the flowing material or adjust the drive signal, if necessary.

Typically, vibrating flow devices are provided with two vibrating conduits that vibrate in opposition to each other in order to create an inherently balanced system. As a result, the vibrations from each conduit balance each other out in a manner that prevents undesired vibrations from one conduit from passing to the other conduit. There are, however, certain applications where dual conduits are undesirable, for example, due to problems with pressure drops or clogging. In such situations a single conduit system may be desirable.

Imbalance in single conduit systems arises due to the fact that pick-offs measure motion by determining relative position between a first pick-off component located on a reference member and a second pick-off component located on the conduit. Accordingly, undesirable vibrations that pass to the reference member may cause the component of the pick-offs located on the reference member to vibrate or move in an undesirable manner. This, in turn, may affect the sensed relative position of the pick-off components and generate inaccurate pick-off signals. Furthermore, in some systems, the reference member is designed to vibrate in opposition to the flow conduit. This is generally true in systems where a component of both the driver and a pick-off are both located on a single reference member. As a result, the pick-off component located on the reference member will experience motion that is not related to the flow rate of the fluid flowing through the conduit. This extra motion can impact the meter's sensitivity.

The present invention overcomes these and other problems and an advance in the art is achieved.

SUMMARY OF THE INVENTION

According to an embodiment of the invention, a vibrating sensor assembly is provided. The vibrating sensor assembly includes a conduit, a driver, and at least a first pick-off. The driver includes a first driver component and a second driver component. The first pick-off includes a first pick-off component and a second pick-off component. The vibrating sensor assembly also includes a first reference member. The first pick-off component is coupled to the conduit while the second pick-off component is coupled to the first reference member. The vibrating sensor assembly also includes a second reference member. The first driver component is coupled to the conduit while the second driver component is coupled to the second reference member.

According to another embodiment of the invention, a method for forming a flow meter is provided. The flow meter includes a flow conduit, a driver with a first driver component and a second driver component, and a first pick-off sensor with a first pick-off component and a second pick-off component. The method comprises the step of positioning a first reference member proximate the flow conduit. The method further comprises the steps of coupling the first pick-off component to the flow conduit and coupling the second pick-off component to the first reference member proximate the first pick-off component. The method further comprises the steps of positioning a second reference member proximate the flow conduit, coupling the first driver component to the flow conduit, and coupling the second driver component to the second reference member proximate the first driver component.

ASPECTS

According to an aspect of the invention, a vibrating sensor assembly comprises:
a conduit;
a driver including a first driver component and a second driver component;
a first pick-off sensor including a first pick-off component and a second pick-off component;
a first reference member, wherein the first pick-off component is coupled to the conduit and the second pick-off component is coupled to the first reference member; and
a second reference member, wherein the first driver component is coupled to the conduit and the second driver component is coupled to the second reference member.

Preferably, the vibrating sensor assembly further comprises a balance member coupled to the conduit, wherein the second reference member is coupled to the balance member.

Preferably, the second reference member is coupled to the balance member such that a combined center of mass of the second reference member and the balance member is located on a bending axis of the flow conduit.

Preferably, the vibrating sensor assembly further comprises a second pick-off sensor including a first pick-off component coupled to the conduit and a second pick-off component coupled to the first reference member.

Preferably, the vibrating sensor assembly further comprising a second pick-off sensor including a first pick-off component coupled to the conduit and a second pick-off component coupled to a third reference member.

According to another aspect of the invention, a method for forming a flow meter including a flow conduit, a driver with a first driver component and a second driver component, and a first pick-off sensor with a first pick-off component and a second pick-off component comprises the steps of:

positioning a first reference member proximate the flow conduit;
coupling the first pick-off component to the flow conduit;
coupling the second pick-off component to the first reference member proximate the first pick-off component;
positioning a second reference member proximate the flow conduit;
coupling the first driver component to the flow conduit; and
coupling the second driver component to the second reference member proximate the first driver component.

Preferably, the method further comprises the step of coupling a balance member to the flow conduit and coupling the second reference member to the balance member.

Preferably, the method further comprises the step of coupling the second reference member to the balance member such that a combined center of mass of the second reference member and the balance member are located on a bending axis of the flow conduit.

Preferably, the method further comprises the steps of coupling a first pick-off component of a second pick-off to the flow conduit and coupling a second pick-off component of the second pick-off to the first reference member proximate the first pick-off component of the second pick-off.

Preferably, the method further comprises the steps of coupling a first pick-off component of a second pick-off to the flow conduit and coupling a second pick-off component of the second pick-off to a third reference member proximate the first pick-off component of the second pick-off.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
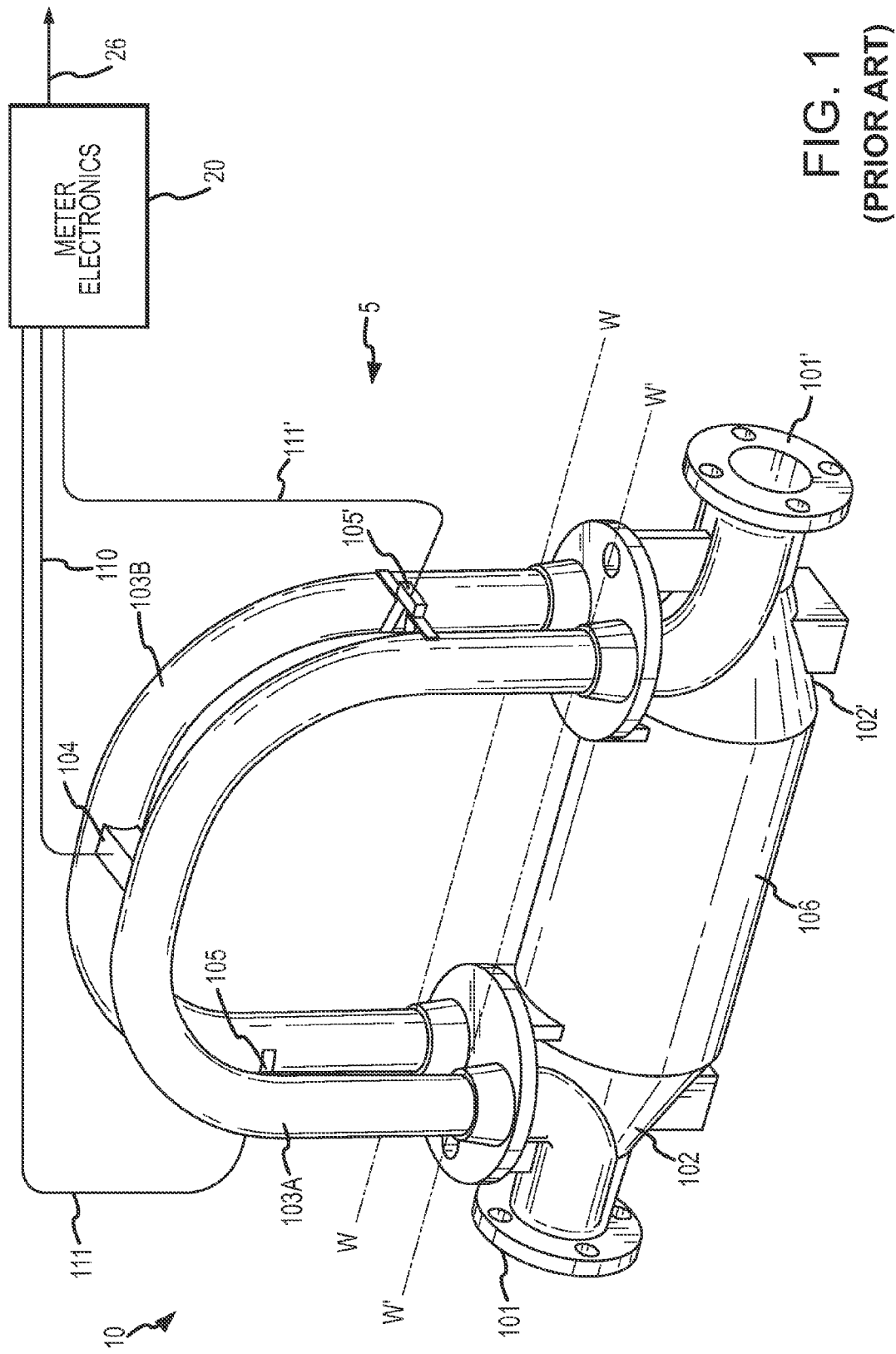
FIG. 1 shows a prior art dual conduit vibrating flow device.

FIG. 1 illustrates an example of a prior art vibrating sensor assembly 5 in the form of a Coriolis flow meter comprising a flow meter 10 and one or more meter electronics 20. The one or more meter electronics 20 are connected to the flow meter 10 to measure a characteristic of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits extend outwardly from the manifolds in an essentially parallel fashion. When flow meter 10 is inserted into a pipeline system (not shown) which carries the flowing material, the material enters flow meter 10 through flange 101, passes through inlet manifold 102 where the total amount of material is directed to enter conduits 103A and 103B, flows through conduits 103A and 103B and back into outlet manifold 102' where it exits the flow meter 10 through flange 101'.

The flow meter 10 includes a driver 104. The driver 104 is affixed to conduits 103A, 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. Driver 104 may comprise one of many well known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by driver 104 in opposite directions about their respective bending axes W and W'. A drive signal in the form of an alternating current can be provided by one or more meter electronics 20, such as for example via pathway 110, and passed through the coil to cause both conduits 103A, 103B to oscillate. Those of ordinary skill in the art will appreciate that other drive modes may be used within the scope of the present invention.

The flow meter 10 shown includes a pair of pick-offs 105, 105' that are affixed to conduits 103A, 103B. More particularly, a first pick-off component (not shown) is located on conduit 103A and a second pick-off component (not shown) is located on conduit 103B. In the embodiment depicted, the pick-offs 105, 105' are located at opposing ends of the conduits 103A, 103B. The pick-offs 105, 105' may be electromagnetic detectors, for example pick-off magnets and pick-off coils that produce pick-off signals that represent the velocity and position of the conduits 103A, 103B. For example, the pick-offs 105, 105' may supply pick-off signals to the one or more meter electronics 20 via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the example shown in FIG. 1, the one or more meter electronics 20 receive the pick-off signals from the pick-offs 105, 105'. Path 26 provides an input and an output means that allows one or more meter electronics 20 to interface with an operator or other processing system. The one or more meter electronics 20 measure a characteristic of a flowing material, such as, for example, density, mass flow rate, volume flow rate, totalized mass flow, temperature, and other information. More particularly, the one or more meter electronics 20 receive one or more signals, for example, from pick-offs 105, 105' and one or more temperature sensors (not shown), and use this information to measure a characteristic of a flowing material, such as, for example, density, mass flow rate, volume flow rate, totalized mass flow, temperature, and other information.

The techniques by which vibrating measuring devices, such as, for example, Coriolis flow meters, or densitometers, measure a characteristic of a flowing material are well understood; therefore, a detailed discussion is omitted for brevity of this description.

Figure 2:
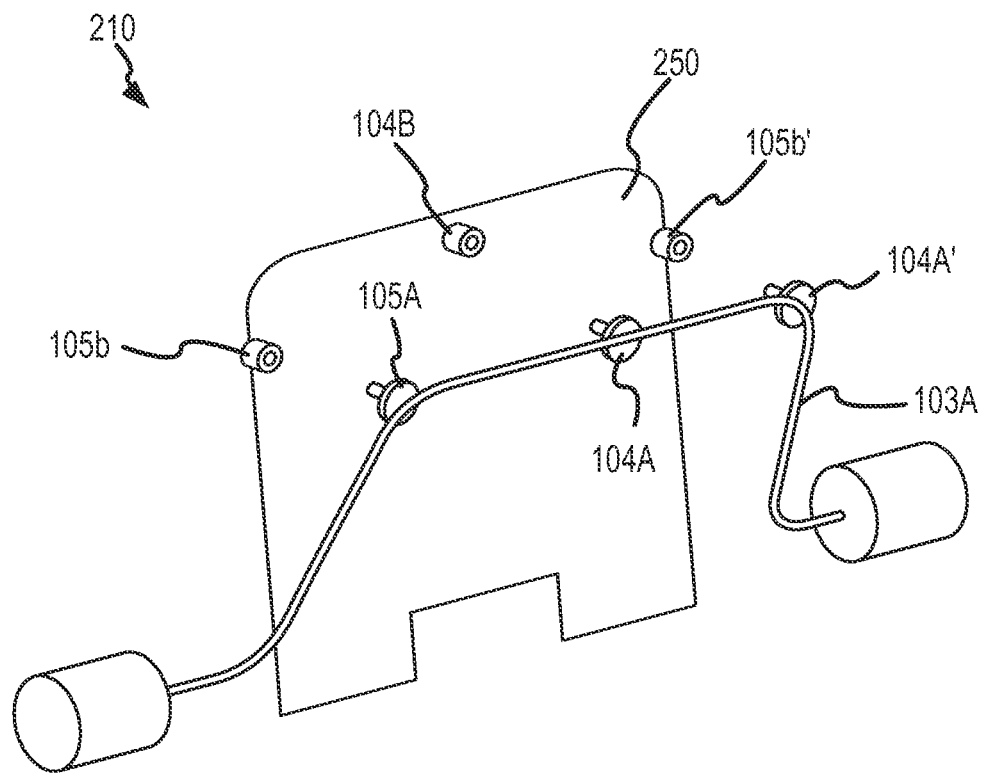
FIG. 2 shows a prior art single conduit sensor assembly.

FIG. 2 shows another example of a prior art sensor assembly 210. The sensor assembly 210 is similar to the sensor assembly 10 shown in FIG. 1, except that the sensor assembly 210 includes a single conduit 103A and a reference member 250 on which a component of the driver 104 and pick-offs 105, 105' are mounted. As shown, a first driver component 104a and first pick-off components 105a, 105a' are located on the conduit 103A. Also shown, a second driver component 104b and second pick-off components 105b, 105b' are located on reference member 250. The first components 104a, 105a, 105a' may be a magnet and the second components 104b, 105b, 105b' may be a coil. Alternatively, the first components 104a, 105a, 105a' may be a coil and the second components 104b, 105b, 105b' may be a magnet. As shown, the reference member 250 may be a reference plate. Alternatively, the reference member may be a dummy tube (not shown) or any other structure, regardless of shape.

In the example shown in FIG. 2, because the second pick-off components 105b, 105b' are located on the same reference member 250 as the second driver component 104b, the second pick-off components 105b, 105b' will vibrate as the driver 104 vibrates the conduit 103A, the reference member 250, and the second driver component 104b. In the present example, the first and second driver components 104a, 104b of the driver 104 force the conduit 103A and the reference member 250 away from each other such that they oscillate away and then toward each other in phase opposition.

With the second pick-off components 105b, 105b' located on the reference member 250, any motion imparted to the reference member 250 may impart motion to the second pick-off components 105b, 105b'. This, in turn, may affect the accuracy of the pick-off signals. More particularly, because the pick-offs 105, 105' measure motion of the conduit 103A, motion imparted to the second pick-off components 105b, 105b' may affect the accuracy of the measured motion of the conduit 103A.

Figure 3:
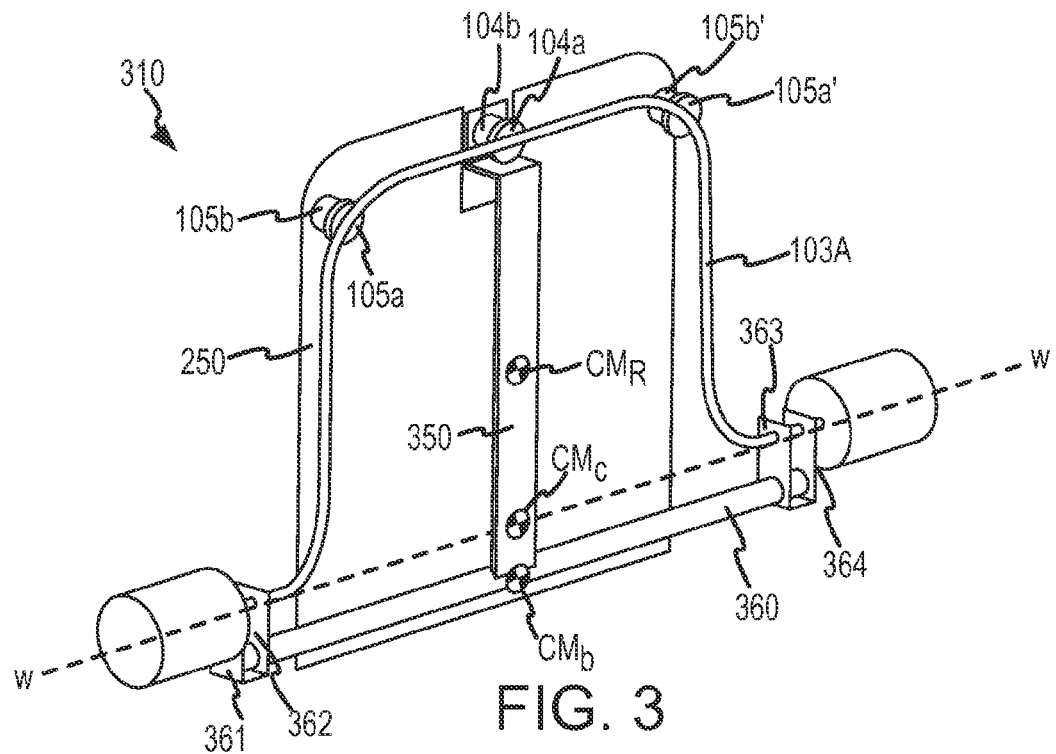
FIG. 3 shows a single conduit sensor assembly according to an embodiment of the invention.

FIG. 3 shows a vibrating sensor assembly 310 according to an embodiment of the present invention. As shown, the sensor assembly 310 is similar to the sensor assembly 210 shown in FIG. 2, except that the sensor assembly 310 includes second pick-off components 105b, 105b' that are coupled to a first reference member 250 and a second driver component 104b coupled to a second reference member 350 that is separate from the first reference member 250. The first and second reference members 250, 350 may be positioned proximate the flow conduit 103A. The sensor assembly 310 also includes first pick-off components 105a, 105a' and a first driver component 104a located on the conduit 103A, similar to the arrangement shown in FIG. 2. It should be appreciated that in use, the vibrating sensor assembly 310 may also include a case (not shown) that substantially surrounds the components shown in FIG. 3.

As shown in FIG. 3, the second pick-off components 105a, 105a' may be located on a first reference member 250 and the second driver component 104a may be located on a second reference member 350. The first and second reference members 250, 350 may be separated in a manner that prevents or substantially reduces motion of the second reference member 350 or second driver component 104b from imparting motion to the first reference member 250 or second pick-off components 105b, 105b'. According to an embodiment of the invention, the second reference member 350 may be substantially independent from both the first reference member 250 and the conduit 103A. For example, the second reference member 350 may be connected to a sensor assembly case (not shown) or some other external member.

According to another embodiment of the invention, the second reference member 350 may be coupled to a balance member 360. The balance member 360 may be coupled to the conduit 103A via a plurality of brace bars 361-364. The plurality of brace bars 361-364 may help define the bending axis W-W of the vibrating conduit 103A, as is generally known in the art. The balance member 360 may be provided to vibrate in phase opposition to the conduit 103A. Therefore, the balance member 360 can be provided to balance the vibrations of the flow conduit 103A. According to an embodiment of the invention, the balance member 360 may have a center of mass $CM_b$ that is located below the flow conduit's bending axis W-W. According to an embodiment of the invention, the second reference member 350 may have a center of mass $CM_R$. According to an embodiment of the invention, the balance member 360 may be sized and located such that the balance member 360 and the second reference member 350 have a combined center of mass $CM_C$ located proximate the flow conduit's bending axis W-W. Advantageously, the second reference member 350, the balance member 360, and the conduit 103A can comprise a balanced system without imparting external vibrations to the second pick-off components 105b, 105b'. Although the balance member 360 is shown as comprising a balance bar, it should be appreciated that the balance member 360 may comprise any configuration, including for example, a dummy tube having a straight or curved configuration. Therefore, the balance member 360 should not be limited to the particular configuration shown.

Figure 4:
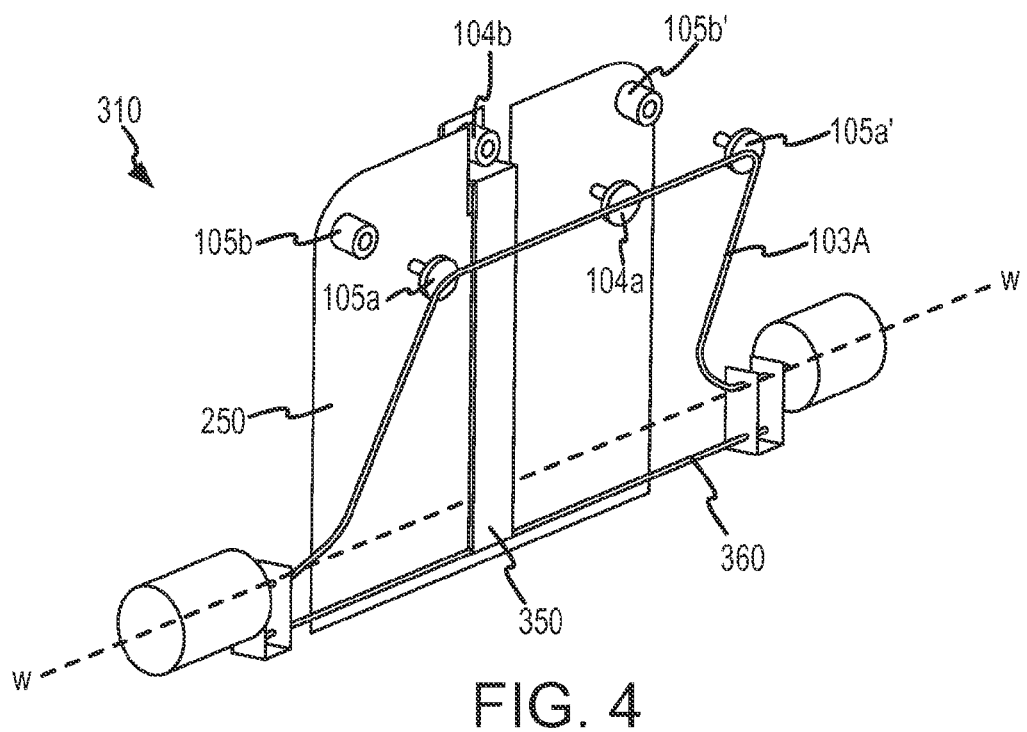
FIG. 4 shows a single conduit sensor assembly according to another embodiment of the invention.

FIG. 4 shows the sensor assembly 310 with the driver 104 actuated according to an embodiment of the invention. With the driver 104 vibrating the conduit 103A, motion is imparted to the conduit 103A, the first pick-off components 105a, 105a', the first driver component 104a, the second driver component 104b, and the second reference member 350 on which the second component 104b of the driver 104 is located. Because the second pick-off components 105b, 105b' and the first reference member 250 on which the second pick-off components 105b, 105b' are separate from the first driver component 104a and the second reference member 350, neither the motion of the driver 104 nor the motion of the second reference member 350 impart significant motion to the first reference member 250 or the second pick-off components 105b, 105b'. Furthermore, since the first reference member 250 and the second pick-off components 105b, 105b' are structurally isolated from the conduit 103A, according to an embodiment of the invention, motion of the conduit 103A or its associated structures 104a, 105a, 105a' imparted on the first reference member 250 or the second pick-off components 105b, 105b' may be substantially reduced. Accordingly, the pick-off signals generated by the pick-offs 105, 105' can more accurately reflect the motion of the conduit 103A in a manner that is not influenced by motion of the second pick-off components 105b, 105b'.

As shown in FIGS. 3 and 4, the first and second reference members 250, 350 may be provided in the form of a reference plate; however, within the scope of the present invention, the reference members 250, 350 may be any structure whereon the second pick-off components 105*b*, 105*b*' and second driver component 104*b* may be mounted in a manner that separates the second pick-off components 105*b*, 105*b*' from the second driver component 104*b*. By way of example, and not limitation, either one or both of the reference members 250, 350 may be a dummy tube or another structure, regardless of shape.

Although the embodiment shown in FIGS. 3 and 4 are provided with a first reference member 250 wherein the second pick-off components 105*b*, 105*b*' are located, those of ordinary skill in the art will appreciate that it is within the scope of the present invention to locate the second pick-off components 105*b*, 105*b*' on separate reference members, for example, a first reference member 250 and a third reference member 550 (See FIG. 5) that are structurally isolated from the second reference member 350 and the conduit 103A.

Figure 5:
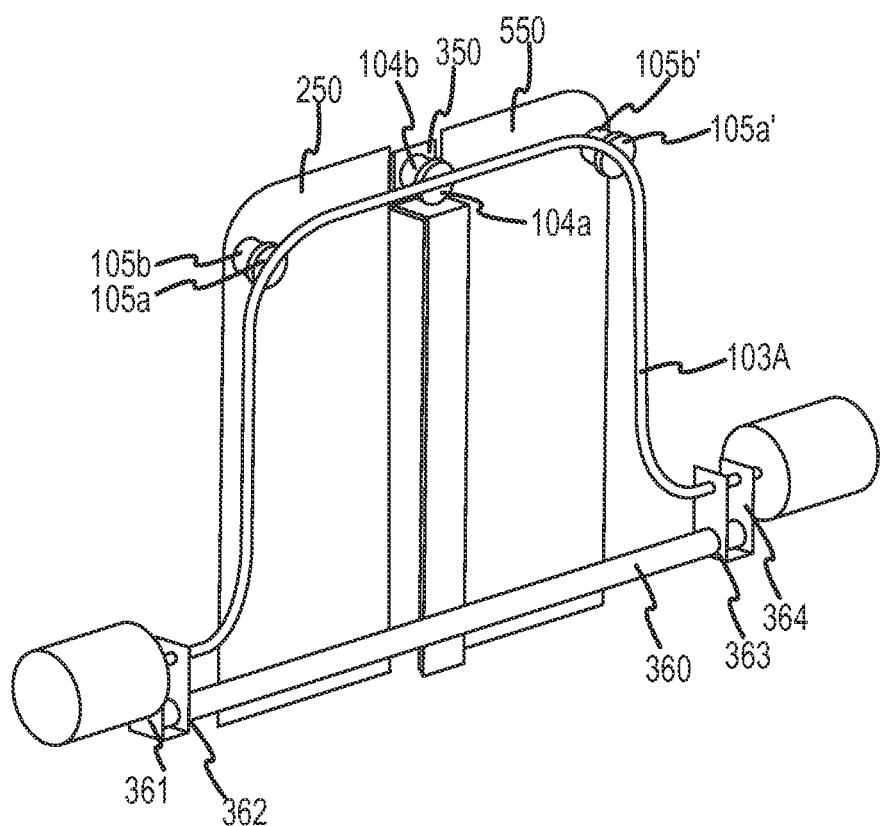
FIG. 5 shows a single conduit sensor assembly according to another embodiment of the invention.

FIG. 5 shows the vibrating sensor assembly 310 according to another embodiment of the invention. The embodiment shown in FIG. 5 is similar to the embodiments shown in FIGS. 3 & 4 except that the second pick-off component 105*b*' is coupled to a third reference member 550. The third reference member 550 can be formed separate from the first reference member 250 and the second reference member 350. Furthermore, as shown in FIG. 5, the second reference member 350 is not connected to the balance member 360 as in the previously shown embodiments. Rather, the second reference member 350 may be connected to the vibrating sensor assembly's case (not shown) or some other external component. Therefore, it should be appreciated that the second reference member 350 is not necessarily provided to balance the vibrations experienced by the flow conduit 103A, but rather is provided to separate the structure on which the second driver component 104*b* and the second pick-off components 105*b*, 105*b*' are mounted.

As described above, the present invention provides a vibrating sensor assembly 310 that couples the second driver component 104*b* and the second pick-off components 105*b*, 105*b*' to separate reference members 250, 350. Advantageously, the driving force experienced by the second reference member 350 as the driver 104 pushes off from the second reference member 350 when driving the flow conduit 103A, is not experienced by the first reference member 250, or is at least substantially reduced. Advantageously, relative motion of the pick-offs 105, 105' is substantially limited to motion experienced by the flow conduit 103A. This separation can substantially reduce errors that may be experienced in the pick-off signals due to vibrations caused by the first reference member moving due to the driver 104.

In forming the vibrating sensor assembly 310, the first and second reference members 250, 350 can be positioned proximate the flow conduit 103A. In some embodiment, the reference members 250, 350 are positioned on the same side of the flow conduit 103A. However, in other embodiments, the reference members 250, 350 may be positioned on opposite sides of the flow conduit 103A. With the reference members 250, 350 in place, the first driver component 104*a* can be coupled to the flow conduit 103A and the second driver component 104*b* can be coupled to the second reference member 350. Likewise, the first pick-off components 105*a*, 105*a*' can be coupled to the conduit 103A and the second pick-off components 105*b*, 105*b*' can be coupled to the first reference member 250. In some embodiment, the second pick-off component 105*b*' can be coupled to a third reference member 550 as described above. It should be appreciated that the particular order in which the vibrating sensor assembly 310 is formed is not important for purposes of the present invention and therefore, should not limit the scope of the present invention.

It should be apparent to those skilled in the art that it is within the scope of the present invention to use the principals discussed herein in conjunction with any type of vibrating flow device, including, for example, densitometers, regardless of the number of drives, the number of pick-offs, the operating mode of vibration, or the determined characteristic of the flowing substance. The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The detailed descriptions of the above embodiments are not exhaustive descriptions of all embodiments contemplated by the inventors to be within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A vibrating sensor assembly (310), comprising:
   a conduit (103A);
   a driver (104) including a first driver component (104 *a*) and a second driver component (104 *b*);
   a first pick-off sensor (105) including a first pick-off component (105 *a*) and a second pick-off component (105 *b*);
   a first reference member (250), wherein the first pick-off component (105 *a*) is coupled to the conduit (103A) and the second pick-off component (105 *b*) is coupled to the first reference member (250); and
   a second reference member (350), wherein the first driver component (104 *a*) is coupled to the conduit (103A) and the second driver component (104 *b*) is coupled to the second reference member (350).

2. The vibrating sensor assembly (310) of claim 1, further comprising a balance member (360) coupled to the conduit (103A), wherein the second reference member (350) is coupled to the balance member (360).

3. The vibrating sensor assembly (310) of claim 1, further comprising a balance member (360) coupled to the conduit (103A), wherein the second reference member (350) is coupled to the balance member (360) such that a combined center of mass (CMC) of the second reference member (350) and the balance member (360) is located on a bending axis (W-W) of the flow conduit (103A).

4. The vibrating sensor assembly (310) of claim 1, further comprising a second pick-off sensor (105') including a first pick-off component (105 a') coupled to the conduit (103A) and a second pick-off component (105 b') coupled to the first reference member (250).

5. The vibrating sensor assembly (310) of claim 1, further comprising a second pick-off sensor (105') including a first pick-off component (105 a') coupled to the conduit (103A) and a second pick-off component (105 b') coupled to a third reference member (550).

6. A method for forming a flow meter including a flow conduit, a driver with a first driver component and a second driver component, and a first pick-off sensor with a first pick-off component and a second pick-off component, comprising the steps of:

positioning a first reference member proximate the flow conduit;

coupling the first pick-off component to the flow conduit;

coupling the second pick-off component to the first reference member proximate the first pick-off component;

positioning a second reference member proximate the flow conduit;

coupling the first driver component to the flow conduit; and coupling the second driver component to the second reference member proximate the first driver component.

7. The method of claim 6, further comprising the steps of coupling a balance member to the flow conduit and coupling the second reference member to the balance member.

8. The method of claim 6, further comprising the steps of coupling a balance member to the flow conduit and coupling the second reference member to the balance member such that a combined center of mass of the second reference member and the balance member are located on a bending axis of the flow conduit.

9. The method of claim 6, further comprising the steps of coupling a first pick-off component of a second pick-off to the flow conduit and coupling a second pick-off component of the second pick-off to the first reference member proximate the first pick-off component of the second pick-off.

10. The method of claim 6, further comprising the steps of coupling a first pick-off component of a second pick-off to the flow conduit and coupling a second pick-off component of the second pick-off to a third reference member proximate the first pick-off component of the second pick-off.

* * * * *